US007561412B2

(12) United States Patent
Brandt et al.

(10) Patent No.: US 7,561,412 B2
(45) Date of Patent: Jul. 14, 2009

(54) SYSTEM AND METHOD FOR AUTOMATICALLY SECURING A MOTOR CONTROL CENTER

(75) Inventors: David D. Brandt, Milwaukee, WI (US); David L. Jensen, Barneveld, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 107 days.

(21) Appl. No.: 11/541,294

(22) Filed: Sep. 29, 2006

(65) Prior Publication Data

US 2008/0081516 A1 Apr. 3, 2008

(51) Int. Cl.
*H05K 5/02* (2006.01)
(52) U.S. Cl. ...................................... 361/616
(58) Field of Classification Search ................. 439/142, 439/911; 361/1, 212, 115, 609, 616; 307/328; 200/50.02, 50.12, 50.17; 340/506, 521
See application file for complete search history.

(56) References Cited

U.S. PATENT DOCUMENTS

| 2,043,099 | A | * | 6/1936 | Hanna | 361/62 |
| 2,090,517 | A | * | 8/1937 | Moyer | 361/115 |
| 4,067,052 | A | * | 1/1978 | Neuhoff | 361/42 |
| 4,319,146 | A | * | 3/1982 | Wires, Sr. | 307/328 |
| 4,658,322 | A | * | 4/1987 | Rivera | 361/37 |
| 6,014,083 | A | | 1/2000 | Bauerschmidt et al. | |
| 6,049,284 | A | | 4/2000 | Heuer | |
| 6,346,882 | B1 | * | 2/2002 | Hain et al. | 340/521 |
| 6,380,725 | B1 | | 4/2002 | Chavez et al. | |
| 6,744,363 | B1 | * | 6/2004 | Nicolai et al. | 340/506 |
| 6,943,999 | B2 | * | 9/2005 | Gray et al. | 361/1 |
| 7,003,412 | B2 | | 2/2006 | Jensen et al. | |
| 7,012,516 | B2 | * | 3/2006 | Laurosch et al. | 340/501 |
| 7,063,572 | B2 | | 6/2006 | Brandt et al. | |
| 7,191,074 | B2 | * | 3/2007 | Rostron et al. | 702/60 |
| 2004/0017643 | A1 | * | 1/2004 | Hartling et al. | 361/212 |
| 2006/0063434 | A1 | | 3/2006 | Bergmann et al. | |

FOREIGN PATENT DOCUMENTS

| DE | 102004050191 | 4/2006 |
| EP | 0826917 | 3/1998 |
| WO | WO0161365 | 8/2001 |
| WO | WO2005029101 | 3/2005 |

OTHER PUBLICATIONS

U.S. Appl. No. 11/271,002, filed Nov. 11, 2005, Malkowski, Jr. et al.
U.S. Appl. No. 11/271,007, filed Nov. 11, 2005, Malkowski, Jr. et al.

* cited by examiner

*Primary Examiner*—Neil Abrams
(74) *Attorney, Agent, or Firm*—Fletcher Yoder; Alexander R. Kuszewski (57) ABSTRACT

A system, in one embodiment, includes a power distribution center having an enclosure with an access door configured to move between a closed position and an open position. The system also includes a monitoring system configured to monitor operational parameters inside the enclosure. Also, the system includes an entry control system coupled to the monitoring system, wherein the entry control system is configured to lock the access door if the operation parameters are indicative of a potentially hazardous condition inside the enclosure.

27 Claims, 6 Drawing Sheets

SYSTEM AND METHOD FOR AUTOMATICALLY SECURING A MOTOR CONTROL CENTER

BACKGROUND

The present invention relates generally to the field of packaged electrical systems. More particularly, the invention relates to a system and method for securing a motor control center (MCC).

A range of applications exist for packaged electrical and electronic components, particularly power electronic components such as those used to power loads in industrial applications. In one type of packaged system, typically referred to as a motor control center (MCC), various switch gear, control devices, protective circuit devices, programmable logic controllers, motor drives, and so forth are housed in a large enclosure that may be subdivided into compartments. The enclosure is supplied with power by power buses that extend generally in a plane toward the rear of the enclosure. The individual compartments typically house associated circuitry that may be withdrawn from the enclosure for servicing and replacement. Compartmentalizing such systems greatly enhances the ability to service the system components, and also serves to isolate the system components from one another. Thus, where access or service is required for components within one compartment of the enclosure, that compartment alone may be opened and the component support withdrawn for the necessary service.

A typical MCC is internally accessible for purposes of maintenance, repair, reconfiguration, and so forth. Unfortunately, the MCC typically contains high voltages that can be hazardous during operation of the MCC. A voltmeter may be used to detect the presence or absence of a hazardous voltage within the MCC, yet the use of the voltmeter generally entails access to the interior of the enclosure. As a result, the device is generally treated as energized and special safety precautions are taken until each component can be verified as de-energized by manually testing the components inside the MCC. The special safety precautions often entail the use of personal protective equipment, which may be awkward to work in and hamper the taking of measurements.

BRIEF DESCRIPTION

A system, in one embodiment, includes a power distribution center having an enclosure with an access door configured to move between a closed position and an open position. The system also includes a monitoring system configured to monitor operational parameters inside the enclosure. Also, the system includes an entry control system coupled to the monitoring system, wherein the entry control system is configured to lock the access door if the operation parameters are indicative of a potentially hazardous condition inside the enclosure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
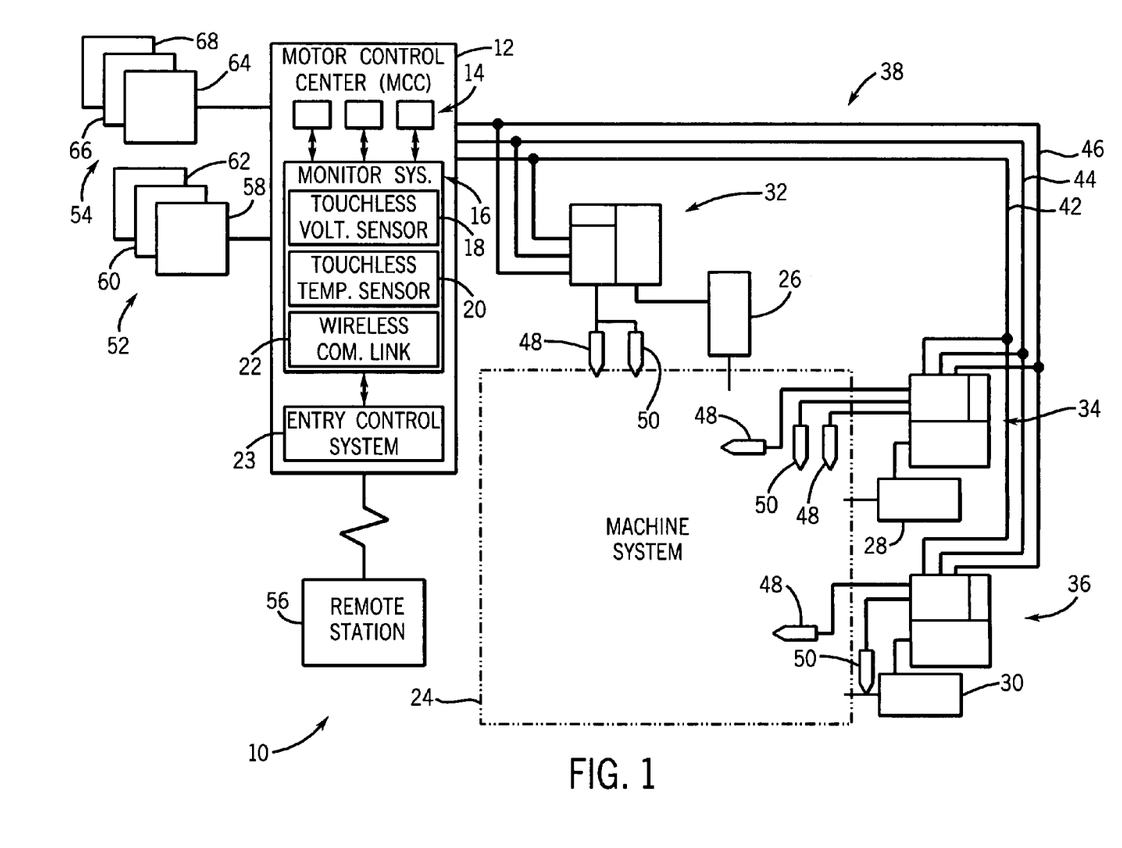
FIG. 1 is a block diagram of an exemplary system having a plurality of components, e.g., motors, networked together via a motor control center.

Turning to the figures, FIG. 1 is a diagram illustrating an exemplary system 10 having a power distribution center, e.g., a motor control center (MCC) 12, with various control circuitry and components 14 and a monitoring system 16. As discussed in detail below, the monitoring system 16 includes one or more touchless voltage sensors 18, one or more touchless temperature sensors 20, and one or more wireless communication links 22. In other words, the touchless sensors 18 and 20 do not directly contact or electrically connect with the wires, components, and so forth. In some embodiments, the touchless sensors 18 and 20 are standalone units that have their own wireless communication links 22 (e.g., transceivers), such that the sensors are completely electrically isolated from other components. In other embodiments, the touchless sensors 18 and 22 are electrically isolated by using optical cables, which lead to the monitoring system 16. Further embodiments employ opto-isolators or transformers to electrically isolate the sensors 18 and 20. An opto-isolator or optical isolator may be described as an electronic device that uses optics to transfer a signal while keeping the receiving and transmitting circuits electrically isolated. A transformer may be described as an electrical device that transfers energy from one circuit to another by magnetic coupling with no moving parts, thereby providing electrical isolation between circuits.

These touchless sensors 18 and 20 are configured to monitor voltage and temperature of individual wires/components, or groups of wires/components, or the entire set of wires/components within the MCC 12. In addition, the illustrated MCC 12 includes an entry control system 23 configured to cooperate with the monitoring system 16 to control access to the interior of the MCC 12. Together, the monitoring system 16 and the entry control system 23 automatically protect an operator from hazardous voltages inside the MCC 12. However, the monitoring system 16 may be implemented without the entry control system 23 or with an external display, hand-held service unit, or other local or remote indication of the internal operating conditions of the MCC 12. Similarly, the entry control system 23 may be implemented with other types of sensors, such as voltage sensors directly connected to (e.g., in contact with) the specific components (or wires) within the MCC 12.

The monitoring system 16 is configured to monitor temperature and voltage, among other things, without contacting (e.g., isolated from) the hazardous voltages passing through the components 14. The touchless voltage sensors 18 are configured for adjustable sensitivity (useful in discerning phase), multiple sensor distribution at specific points throughout the MCC 12, multiple sensors for adjacent phases, and wireless data monitoring and logging via the wireless communication link 22. In certain embodiments, the touchless voltage sensor 18 includes an electric-field sensor (E-field sensor), which is configured to detect an electric field of one or more wires or components in the region surrounding the sensor 18. For example, an exemplary E-field sensor 18, such as model number A152-D, is made by Less EMF Inc. of Albany, N.Y.

The touchless temperature sensors 20 are configured for multiple sensor distribution at specific points throughout the MCC 12, phase-to-phase comparison of temperatures, temperature sensing of specific areas known to be hot spots on the components 14, and wireless data monitoring and logging via the wireless communication link 22. In certain embodiments, the touchless temperature sensor 20 includes a thermopile radiation sensor, a radiation pyrometer, an optical pyrometer, an infrared thermometer, or a combination thereof. Each of these exemplary sensors 20 is configured to measure temperature without actual contact to the heat source. In other words, these touchless temperature sensors 20 measure the intensity of incident radiation at a distance from the heat source. A thermopile radiation sensor typically includes a plurality of thermocouples connected in series, wherein all of the hot junctions are arranged to lie in the field of the incoming radiation and all of the cold junctions are disposed in thermal contact with the pyrometer housing to remain at ambient temperature.

Thus, the specific components, subcomponents, wires, hot-spots, and so forth may be individually monitored for temperature and voltage without opening the MCC 12, thereby improving the safety, reliability, and performance of the system 10. In other words, the MCC 12 can remain completely closed and locked while the operator receives the voltage and temperature data at a protected position outside of the MCC 12. The voltage data automatically measured from within the confines of the MCC 12 also may be used to control access to the MCC 12 via the entry control system 23. For example, if the voltage sensors 18 detect that the MCC 12 is active (e.g., voltage is still passing through the MCC 12), then the entry control system 23 generally locks down the MCC 12 to prevent operator access. In this manner, the operator is automatically isolated or protected from hazardous voltages inside the MCC 12. If the voltage sensors 18 detect that the MCC 12 is shut down (e.g., no voltage or primary voltage is cut), then the entry control system 23 identifies the condition as safe and permits access to the interior of (e.g., unlocks) the MCC 12. The monitoring system 16 and the entry control system 23 are discussed in further detail below.

The system 10 may comprise a variety of applications and machinery. For example, the system 10 may comprise one or more commercial or industrial applications, such as manufacturing, processing, distributing, material handling, mining, petrochemical processing, and transportation. Moreover, these applications may entail a variety of products, such as food, beverages, clothing, consumer products, automotive, marine, aircraft (e.g., airport baggage), water, sewage and waste products, petroleum, and so forth. The actual machinery and components employed in the system 10 may comprise one or more motors, pumps, compressors, heating devices, cooling devices, gearing mechanisms, conveyors, robotics, overhead carriers, manufacturing devices (e.g., machining devices), sorting mechanisms, labeling mechanisms, sensors, actuators, solenoids, valves, magnetic starters, relays, and so forth. Accordingly, although specific embodiments are described in further detail below, the present techniques are intended for use in a variety of contexts.

As illustrated, the system 10 comprises a machine system 24 having a plurality of motors or machines 26, 28, and 30. In turn, the machines 26, 28, and 30 comprise on-machine controllers 32, 34, and 36, which are coupled to the MCC 12 via a power and data distribution system 38. In other words, the machines 26, 28, and 30 are generally wired or networked together via the distribution system 38 and the MCC 12. In some embodiments, the distribution system 38 includes direct wires or discrete signal wires leading to the respective machines 26, 28, and 30. In operation, the on-machine controllers 32, 34, and 36 are engageable locally or remotely via the MCC 12 to monitor, process, diagnose, service, or generally control the respective motors or machines 26, 28, 30. Moreover, the illustrated MCC 12 may comprise a variety of hardware and software adapted for monitoring, processing, diagnosing, or generally controlling the system 10. The illustrated system 38 comprises a plurality of data and power lines, such as lines 42, 44, and 46. Using the on-machine controllers 32, 34, and 36 and/or the MCC 12, these lines 42, 44, and 46 facilitate operation and cooperation of the machine system 24, the motors or machines 26, 28, and 30, and a variety of input/output devices, such as sensors 48 and actuators 50.

In addition, the MCC 12 and/or the power and data distribution system 38 may be coupled to a variety of other local and remote MCCs, machine system, monitoring stations, or facilities, such as local MCCs 52 and 54 and remote station 56. For example, the local MCC 52 may have machines or motors 58, 60, and 62, while the local MCC 54 has machines or motors 64, 66, and 68. Again, these MCCs 52 and 54 may have a similar monitoring system 16 with various touchless voltage sensors 18, touchless temperature sensors 20, and wireless communication links 22. The machines or motors 58 through 68 also may have one or more on-machine controllers 32, 34, and 36. These sensors 18 and 20 and the wireless communication links 22 also may be distributed throughout the entire system 10 at various points in the machines or motors 26, 28, and 30, the on-machine controllers 32, 34, and 36, and so forth.

Regarding the wiring arrangement of the illustrated system 10, the lines 42, 44, and 46 may comprise a single phase or multiphase alternating current (AC) power supply line, a direct current (DC) power supply line, and a suitable data communication line. For example, the power and data distribution system 38 may distribute a three-phase 480 Volt AC power supply to one or more of the motors or machines 26, 28, and 30. In addition, the power and a distribution system 38 may distribute a different power supply, such as a single phase 120 Volt AC or a 24 Volt DC power supply, to one or more of the sensors 48 and actuators 50. The illustrated power and data distribution system 38 may comprise a variety of distributed machine networks, circuitry, and protocols, such as DeviceNet, DeviceLogix, ControlNet, EtherNet, and ControlLogix provided by Rockwell Automation, Inc. of Milwaukee, Wis.

Figure 2:
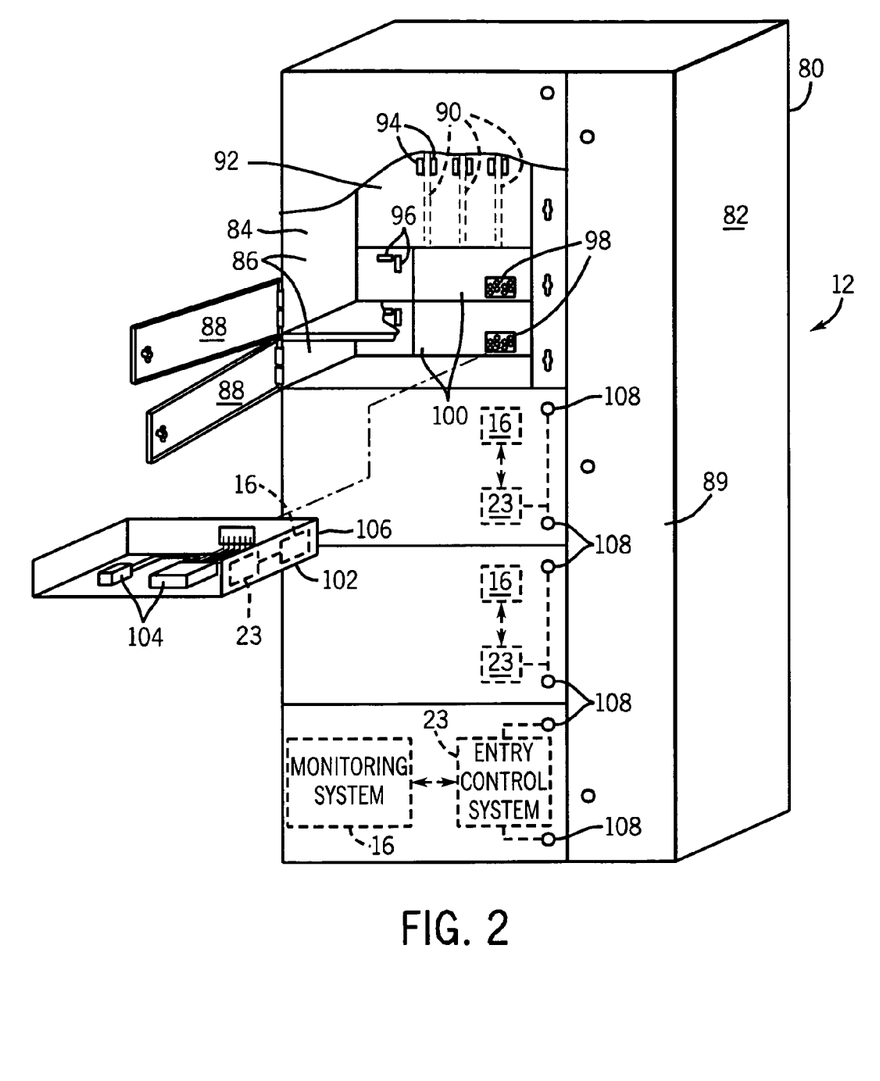
FIG. 2 is a perspective view of an exemplary motor control center.

FIG. 2 is a perspective view of an exemplary embodiment of the MCC 12 as illustrated in FIG. 1. As illustrated, pairs of the monitoring system 16 and the entry control system 23 are mounted at various locations throughout the MCC 12. One or more touchless sensors 18 and 20 and wireless communication links 22 also may be distributed throughout the MCC 12 adjacent specific components, circuits, switches, fuse holders, bus connectors, bus splices, protection devices, disconnects, and so forth. Thus, an operator can obtain temperature and voltage data for specific components, hot spots, and general points of interest in a protected position outside of the MCC 12, for example, at a remote location or directly outside of the MCC 12. In this manner, the operator can confirm the conditions of the MCC 12 prior to gaining access. Moreover, the entry control system 23 is configured to lock and unlock various access points in response to the voltage data and/or the temperature data.

In the illustrated embodiment, the MCC 12 is a packaged electrical system generally having an enclosure 80 in which a range of electrical and electronic components, switchgear, and so forth are housed. It should be noted that, as used herein, the terms motor control center and MCC should include any suitable type of industrial, marine, commercial and other enclosure in which supports are provided for components in a compartmentalized fashion and interface with bus structures provided in the enclosure. For example, the enclosure 82 of the illustrated MCC 12 defines a shell 82 that encloses an internal volume 84 in which compartments 86 are subdivided. Each compartment has standard dimensions, particularly various standard heights. Depending upon the associated components to be mounted in each compartment, the enclosure is be provided with doors 88 that permit individual compartments to be opened for access to the components located therein. Alternatively or additionally, a single door may be disposed over the front of the entire MCC 12. Moreover, the doors 88 and/or single door may include a security/safety lock to restrict access to the components mounted inside. For example, the security/safety lock may include an automated locking or latching mechanism, such as a solenoid-actuated latch. The security/safety lock also may include a manual locking mechanism, such as a padlock. As in the illustrated embodiment, each compartment may be separated by shelves (shown partially broken away in FIG. 2 to show connections along the rear wall). Moreover, for routing of power conductors, load conductors, and so forth, a wire way may be provided in the enclosure, such as the vertical wire way 89 shown on the right side of the enclosure in FIG. 2.

The enclosure 80 includes a series of power buses 90 (shown in dashed lines in FIG. 2) that route three-phases of electrical power to the various compartments. The buses 90 are provided behind a bus cover 92 that limits access to the buses when energized. Slots 94 are provided in pairs, with a number of such rows of such slots being provided for plugging component supports into electrical contact with the buses. In general, component supports include stabs that extend through the slots 94 to make contact with the buses 90.

The arrangement shown in FIG. 2 is particularly adapted for plug-in receipt of component supports by means of receptacles 96 for data and control power, and connectors 94 and 98 for line and load connections. The power and data are provided to each component support at various levels. These levels may include low level power and data connections for the exchange of input and output data, monitoring and control instructions, and so forth via a suitable data exchange protocol, such as DeviceNet. Moreover, power may be provided at a control power level, such as 24 Volt DC or 120 Volt AC for operation of certain of the devices, such as relays and contactors. Such data and control power is provided in the enclosure of FIG. 2 via receptacles 96.

Connectors 98 are provided on subplates 100 that are secured within the enclosure over the bus cover 92. Electrical connections are made on a rear side of the subplates 100 directly to the buses, and wiring then routes power to connectors 98. In a present embodiment, as described in greater detail below, the connectors may be provided for both line connections (incoming power) and load connections (outgoing power) for each component support. Moreover, the connectors may be configured for accommodating both three-wire three-phase power and four-wire three-phase power, with one receptacle being unwired when the connectors are used with three-wire three-phase power.

The compartments thus configured receive component supports as indicated at reference numeral 102. The component supports are configured as slide-in units or drawers that support multiple components 104 that are wired together as subassemblies or sub-circuits. In the embodiment illustrated in FIG. 2, a mating connector 106 is provided on a rear wall of the component support 102. The connector 106 is designed to interface with connectors 98 within the compartment when the component support is slid into place.

In the illustrated embodiment of FIG. 2, a pair of the monitoring system 16 and the entry control system 23 is disposed in each one of the compartments 86, or the component supports 102, or a combination thereof. In turn, the entry control system 23 is coupled to one or more automatically movable locks or latches 108, which removably secure the respective doors 88 across the compartments 86. Thus, if the monitoring system 16 senses a potentially hazardous voltage or temperature condition within the MCC 12 or the particular compartment 86, then the entry control system 23 maintains or changes the latches 108 to secured positions. If the monitoring system 16 senses that a safe condition exists within the MCC 12 or the particular compartment 86, then the entry control system 23 may automatically unlock the latches 108 if an operator desires access. However, the entry control system 23 may retain the latches 108 in secured positions unless the operator actually attempts or desires access to the interior of the MCC 12. In certain embodiments, the latches 108 include solenoids, actuators, motors, linear drives, pneumatic drives, hydraulic drives, or a combination thereof. The latches 108 also may have an override mechanism, such as a slot for the insertion of a screwdriver to release the doors 88.

Figure 3:
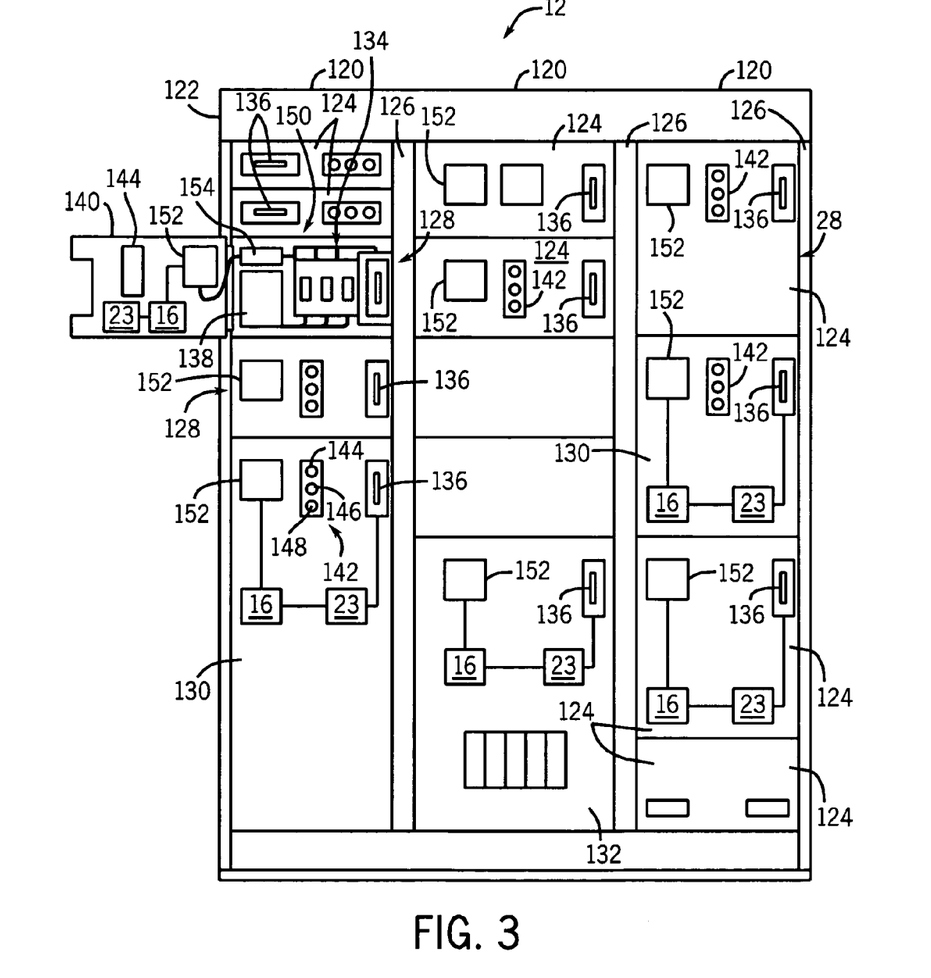
FIG. 3 is a front view of an exemplary motor control center.

FIG. 3 is a front view of another embodiment of a MCC 12 as illustrated in FIG. 1. Again, one or more of the monitoring systems 16 and entry control systems 23 may be incorporated into the MCC 12 of FIG. 3. In the illustrated embodiment, the MCC comprises three sections 120. However, a greater or lesser number of sections 120 may be used. The MCC 12 receives three-phase line power and couples it to each section 120. In the illustrated embodiment, each section 120 has an enclosure 122 that is adapted to couple power to a plurality of units 124. In the illustrated embodiments, the units 124 are adapted to plug-in to the MCC 12. However, other methods of coupling the units 124 to the MCC 12, and other devices, may be used. The units 124, in turn, are adapted to be disposed into the enclosures 122 to receive power. The units 124 may also receive non-hazardous power from a low-voltage (e.g. 24 Volt DC) power source. In addition, the units 124 may receive and transmit data via a pre-established data protocol, such as DeviceNet. In this embodiment, each section 120 has a wire way 126 for routing the communication wiring.

In the illustrated embodiment, the various units 124 comprise several motor control units 128 that are plugged into the MCC 12 to receive power. The motor control units 128 are adapted to selectively control power to one or more electric motors. In this embodiment, the motor control units 128 receive three-phase ac power from the MCC 12. Alternatively, the motor control units 128 may provide ac power to a variable frequency drive 130 to enable the variable frequency drives 130 to produce a variable frequency ac to power one or more electric motors. In the illustrated embodiment, the variable frequency drive 130 is contained within at least some of the motor control units 128. The variable frequency ac power is coupled from each variable frequency drive 130 to a motor via connections within the motor control unit 128. In the illustrated embodiment, a programmable logic controller (PLC) 132 is provided to enable one or more devices to be controlled automatically either from the PLC or via the communications network.

A disconnect 134 is provided to isolate a unit 124 from the MCC 12. In the illustrated embodiment, each disconnect 134 is adapted with three switches, one for each phase of the three-phase alternating current. Each disconnect 134 has a handle 136 disposed on the exterior of the unit 124 that is operable to open and close the switches. In addition, the disconnect 134 is adapted to house a short-circuit protection device. In the illustrated embodiment, the short-circuit protection device comprises three fuses, one for each phase of the three-phase alternating current. However, other short-circuit protection devices may be used. In the illustrated embodiment, the three-phase power is coupled to electrical components 138 within the unit 124.

Each of the units 124 has a door 140 to enable the interior of each unit 124 to be accessed. In addition, some units 124 have a control station 142. In the illustrated embodiment, the control station 142 has a light 144 to provide an indication when the unit 124 is operating. A second light 146 is provided to indicate when an overload condition, or some other fault condition, exists. A control switch 148 is provided to control operation of the unit 124.

The units 124 generally include the monitoring system 16 and the entry control system 23 as discussed above with reference to FIG. 1. Thus, each unit 124 may include one or more touchless voltage sensors 18 (e.g., electric-field sensors), touchless temperature sensors 20 (e.g., thermopiles), and wireless communication links 22. Alternatively or additionally, each unit 124 may include one or more contact sensors configured to monitor voltage, temperature, current, or a combination thereof. For example, the illustrated monitoring system 16 includes a voltage verification system 150 that, among other things, is adapted to detect automatically the presence or absence of hazardous voltages at various locations inside the MCC 12 and the units 124 without having to open the door 140. In the illustrated embodiment, the monitoring systems 16 are coupled to an external display or indicator 152 that is visible from the exterior of the unit 124 with the door 140 in a closed and locked position. The voltage verification system 150 is adapted to provide a positive visual indication of an improper condition, a fault, and/or the presence or absence of voltages inside the MCC 12 and the unit 124 via the indicator 152. Similarly, the monitoring system 16 may provide an indication of the internal MCC 12 temperature via the indicator 152. As an alternative, the positive visual indication may be provided on a control station 142.

In the illustrated embodiment, each voltage verification system 150 is adapted to detect the voltage on each phase of the three-phase power inside the MCC 12 that is provided to a unit 124. Each voltage verification system 150 also is adapted to detect the voltage on each phase of the three-phase power downstream of the switches of the disconnect 134, but upstream of the fuses. In addition, in the illustrated embodiment, the voltage verification system 150 is adapted to detect voltages on each phase of the three-phase power downstream of the fuses.

Each voltage verification system 150 comprises a processor unit 154 coupled to a plurality of voltage sensors (e.g., 18) disposed in the MCC 12 and in a unit 124, in the illustrated embodiment. The voltage detectors may be contact or non-contact sensors. The processor unit 154 is adapted to receive data signals from the voltage sensors and process the data to identify the operating condition of the unit 124, such as a normal condition or a fault condition, based on the voltage data from the plurality of voltage sensors. The voltage verification system 150 also is adapted to verify that there is power in the power lines to the disconnect 134 of a unit 124 and that no hazardous voltages are present inside the unit 124 downstream of the disconnect 134 when the disconnect 134 is open. Thus, the system 150 provides an indication that the unit 124 is electrically isolated from the power bus within the MCC 12 and that the MCC bus power is not temporarily disabled. Redundancy may be utilized as a check-and-balance for the logic sensor or the processor.

Figure 4:
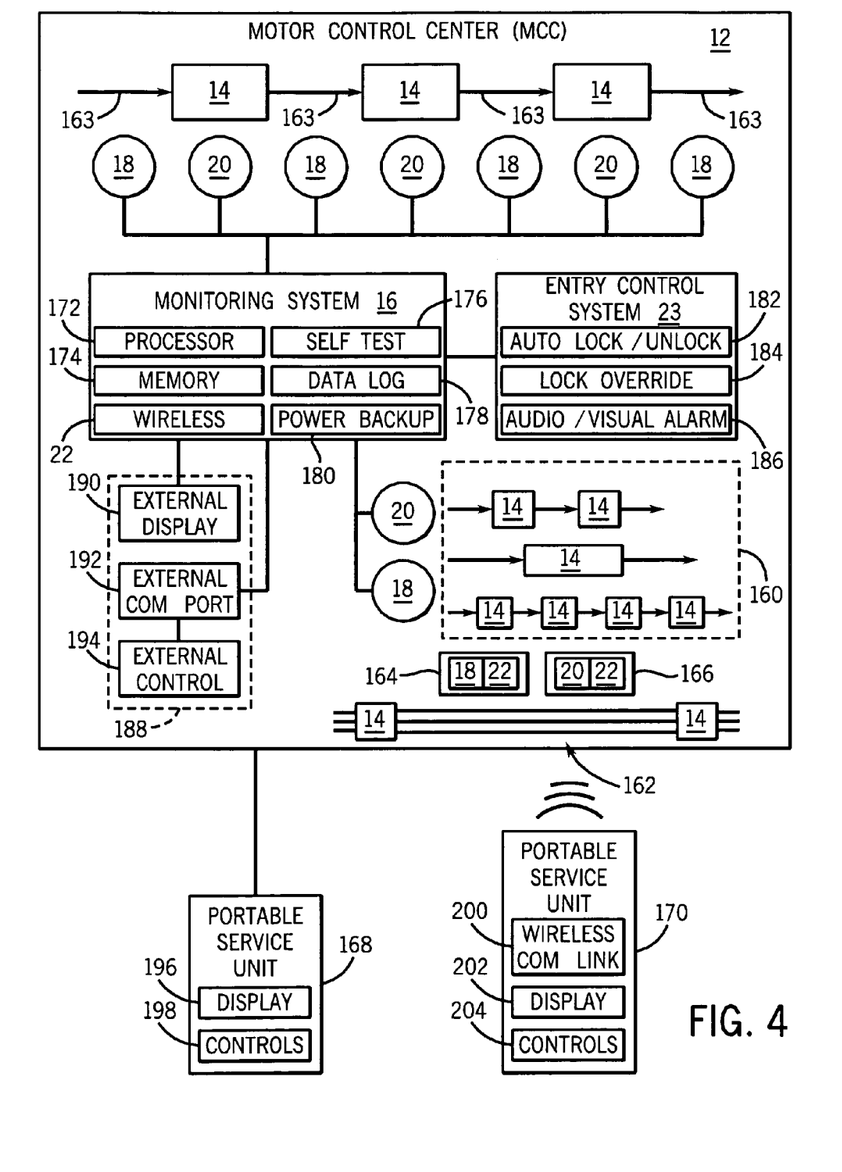
FIG. 4 is a block diagram of an exemplary motor control center, further illustrating details of a monitoring system, an entry control system, and various sensor configurations.

FIG. 4 is a block diagram illustrating an exemplary MCC 12 having various configurations of the sensors 18 and 20 coupled to the monitoring system 16 and the entry control system 23. In the illustrated embodiment, the touchless voltage sensors 18 and the touchless temperature sensors 20 are disposed at a distance from a variety of individual components 14, component groups 160, and wire sets 162. For example, the touchless voltage sensors 18 may be disposed at upstream and downstream locations relative to individual components 14, as illustrated by arrows 164. Again, the touchless voltage sensors 18 are not in electrical contact with the wires or components at the upstream and downstream locations 163, but rather the touchless voltage sensors 18 are electrically isolated and configured to sense voltage without any contact. Similarly, the touchless temperature sensors 20 are electrically isolated from the components 14, and are configured to sense thermal radiation emanating from the various components 14. In certain embodiments, these sensors 18 and 20 may be coupled to the monitoring system 16 via optical cables, such that the sensors 18 and 20 are completely electrically isolated from both the components 14 and the monitoring system 16. For example, the optical cable is configured to communicate sensed data from the particular sensor 18 or 20 without electrically conductive cables. In such a configuration, the sensors 18 and 20 may actually contact the components 14, while the optical cables provide electrical isolation from the surrounding components, the monitoring system 16, and so forth. In other embodiments, the sensors 18 and 20 may be electrically isolated by opto-isolators, transformers, wireless tranceivers, optical cables, or a combination thereof.

In addition, with reference to the component group 160, a single touchless voltage sensor 18 and a single touchless temperature sensor 20 may be arranged in the vicinity of the component group 160, such that the electric field and heat emanating from the various components 14 in the group 160 may be sensed without any contact. In this manner, the sensors 18 and 20 can eliminate the need for multiple sensors to individually monitor specific points within the group 160.

The touchless voltage sensor 18 also may be configured to measure different levels of electrical fields emanating from the various components 14 within the group 160, such that the monitoring system 16 can determine if certain components 14 in the group 160 are energized or de-energized. For example, during the configuration stage, the voltage can be measured for each permutation of one or more components 14 being turned on, and then the electric field level may be recorded and correlated with the particular permutation. These recorded levels and permutations can later be compared with actual voltage measurements during operation of the MCC 12 to identify or predict the actual power state of various components 14.

Furthermore, the touchless voltage sensors 18 and the touchless temperature sensors 20 may be disposed in the general vicinity of the wire sets 162 to sense the overall electric field and thermal energy radiating from the various wires within the set 162. For example, the wire set 162 may be a three-phase wire set extending between components 14, or leading to an output or external load, or leading from a primary power source, or a combination thereof. In certain embodiments, a stand-alone voltage sensor 164 may include both the touchless voltage sensor 18 and the wireless communication link 22 in a single structure or assembly. The stand-alone voltage sensor 164 can be distributed at specific points throughout the MCC 12 and then communicate data to the monitoring system 16 without wires (i.e., complete isolation). Similarly, a stand-alone temperature sensor 166 may include the touchless temperature sensor 20 and the wireless communication link 22 in a single structure or assembly similar to sensor 164. Again, the stand-alone temperature sensor 166 is configured to be distributed at various locations throughout the MCC 12 without wires, such that the temperature data can be wirelessly communicated back to the monitoring system 16. These stand-alone units 164 and 166 also may be configured to communicate voltage and temperature data wirelessly to a destination outside the MCC 12. For example, the stand along units 164 and 166 may communicate with a portable service unit 168 or a wireless portable service unit 170.

In the illustrated embodiment, the monitoring system 16 includes a processor 172, memory 174, the wireless communication link 22, a self test system 176, a data log system 178, and a power backup 180. For example, the memory 174 may include volatile memory, nonvolatile memory, magnetic storage, optical storage, or a combination thereof. The wireless communication link 22 may be isolated from three-phase power, and may include multiple paths for signals and an integrated self test for reliability and safety. The power backup 180 may include one or more batteries, capacitors, or energy scavenging schemes configured to provide power for the sensors 18 and 20, the wireless communication links 22, and various logic and components of the monitoring system 16 and the entry control system 23 in the event of power failure.

The self test system 176 may include code configured to calibrate and/or test the various sensors 18 and 20 before and after a particular measurement, test functions of the entry control system 23, test other control functions within the MCC 12, and so forth. For example, the self test system 176 may test accuracy of the sensors 18 and 20 by comparing the voltage or temperature to a known source, and then subsequently retesting the sensors 18 and 20 after making a voltage and/or temperature measurement.

The data logging system 178 is configured to continuously monitor and log temperature and voltage data, generate historical/trend graphs or profiles, load or modify control schemes based on the trend data, and enable dynamic frequency control based on trend data (i.e., more measurements taken in a given time frame if temperature is rising). The data logging system 178 also may be configured to perform other functions for storing data and facilitating control within the MCC 12.

The monitoring system 16 also may include an electrical field sensing circuit and a DC voltage detection circuit. For example, the electrical field sensing circuit may include a capacitive plate responsive to an electrical field from the various components or wires. The electric field sensing circuit also may include an amplifier, a peak detector, and a capacitor discharge mechanism to clear the sensor after a voltage measurement is taken. The DC voltage detection circuit may have isolation provided by optical coupling or connection to a wireless transceiver. A capacitor or battery also may be provided to ensure operation when power fails or is removed.

The components 14 being monitored by the system 16 may include a circuit breaker, a disconnect switch, a fuse, a connector block, a contactor, a starter coil, a power bus, or a combination thereof. Moreover, the components 14 may include the primary three-phase conductors leading into the MCC 12, the three-phase conductors leading out of the MCC 12 to various machines or motors, and the various control wires within the MCC 12 and leading out of the MCC 12 to various machines and motors. For example, a touchless temperature sensor 20 may be embedded in a fuse holder, a disconnect switch, a circuit breaker, and a starter coil. By further example, a thermopile may be installed in the MCC 12 to monitor a fuse temperature, a disconnect switch blade and pivot joint temperature, a starter coil temperature, a circuit breaker temperature, an incoming line connection temperature, a load connection temperature, and any other device, connection, or zone. In addition, the thermopile may be installed within the MCC 12 to monitor a connection between horizontal and vertical buses, a horizontal bus splice, an incoming line connection, or any other device, connection, or zone. Again, the thermal sensing techniques used by the monitoring system 16 are configured to measure multiple points or areas with one or more of the touchless temperature sensors 20.

Similarly, a touchless voltage sensor 18 may be used to detect hazardous voltages in the MCC 12 at incoming lugs on a disconnect switch or circuit breaker, load lugs on a disconnect switch or a circuit breaker, a load side of fuses, a drive bus (using DC sensor), or any other connection point. As discussed above, the touchless voltage sensor 18 may be configured with adjustable sensitivity (useful in discerning phase), multiple sensor distribution, multiple sensors for adjacent phases, isolation from three-phase voltage, and various logic or truth tables. For example, truth tables for the touchless voltage sensor 18 may include illegal conditions (e.g., to signify sensor or logic fault), indication of no voltage present state, warning of no bus voltage, and so forth. Again, the voltage measurements by the sensors 18 generally enable the monitoring system 16 and the entry control system 23 to warn and/or restrict an operator from accessing the interior of the MCC 12 if hazardous live voltages are detected within the MCC.

In addition, the temperature measurements obtained by the sensors 20 may be used to monitor the temperature of potential thermal hot spots in order to ensure the reliability of the MCC 12 operation and to protect the investment of the customer. For example, the temperature measurements may enable predictability of component failures, overloads, and so forth. Thus, the temperature data may be particularly useful for maintaining the MCC 12 in good working order. Again, embodiments of the touchless temperature sensors 20 may include a thermopile, an optical pyrometer, a radiation pyrometer, an infrared detector or camera, or another form of camera, detector, or sensor configured to sense heat gradients at a distance.

The illustrated entry control system 23 includes an auto lock/unlock system 182, a lock override 184, and an audio-visual alarm 186. For example the auto lock/unlock system 182 may include a solenoid operated door latch, a motor driven lock, or another suitable system that responds to a control signal. The lock override 184 is configured to enable an operator to override a secured position of the auto lock/unlock 182 if the operator desires access to the MCC 12 during operation. However, the lock override 184 may require a positive action by the operator in order to override the auto lock/unlock system 182. For example, the illustrated lock override 184 has a release mechanism that is operated by some positive action by the user, for example, a screwdriver inserted and rotated within a release mechanism in the door of the MCC 12. Alternatively, the override 184 may require some positive user input via a keyboard, a touch screen, or another user input device. At this time, the entry control system 23 also may actuate the audio/video alarm 186 to further warn the operator of the hazardous condition within the MCC 12. For example, the audio/visual alarm may include an audible alert, a flashing light, text and/or graphics on a display, or a combination thereof.

As further illustrated in FIG. 4, the MCC 12 includes an external panel 188 having an external display 190, an external communication port 192, and external controls 194. For example, the external display 190 may include a liquid crystal display, a touch screen, one or more light emitting diodes (LEDs) or other lights, or a combination thereof. The external communication port 192 may include a network port, an infrared communication port, or another type of port configured to enable communication with the portable service unit 168 and/or the wireless portable service unit 170. The external controls 194 may include a keyboard, a numeric keypad, switches, knobs, and other controls configured to enable interaction with the MCC 12, the monitoring system 16, and the entry control system 23. In addition, the portable service unit 168 and the wireless portable service unit 170 may be configured to monitor and/or control various portions of the monitoring system 16 and the entry control system 23. The illustrated portable service unit 168 includes a display 196 and controls 198, while the unit 170 includes a wireless communication link 200, a display 202, and controls 204.

Figure 5:
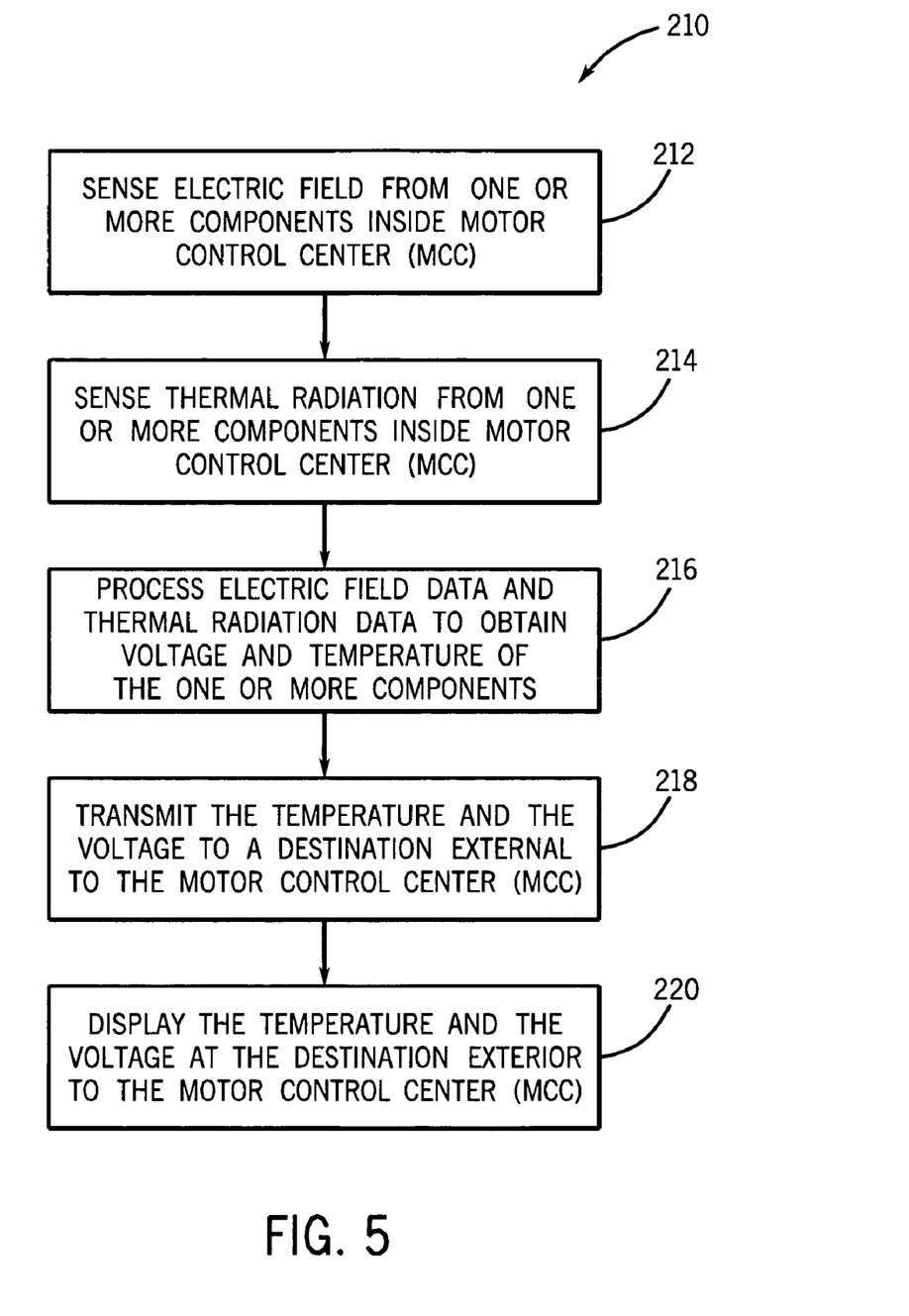
FIG. 5 is a flowchart illustrating an exemplary process of internally monitoring and externally displaying information regarding the operation of a motor control center.

FIG. 5 is a flowchart of an exemplary process 210 for internally sensing and externally displaying operational parameters of a motor control center. For example, the process 210 begins by sensing an electric field from one or more components inside a motor control center (block 212). For example, one or more electric field sensors may be distributed throughout the interior of the motor control center while the interior is completely enclosed and secured by a locking mechanism. The process 210 may then proceed to sense thermal radiation from one or more component inside the motor control center (block 214). Again, one or more thermopiles or other radiation-based temperature sensors may be used to measure heat within the motor control sensor while the interior is completely enclosed and secured by the locking mechanism.

In turn, the process 210 may proceed to process the electric field data and the thermal radiation data to obtain both voltage and temperature of the one or more components within the motor control center (block 216). The process 210 may then transmit the temperature and the voltage to a destination external to the motor control center (block 218). For example, the block 218 may involve wirelessly transmitting the temperature and voltage data to a portable service unit, a remote control station, or a combination thereof via wireless signals. Alternatively, the block 218 may involve conveying the temperature and voltage data to a panel disposed outside of the motor control center. In either case, the block 218 makes the temperature and voltage data accessible outside the motor control center without requiring any access to the interior of the motor control center. The process 210 then proceeds to display the temperature and the voltage at the destination exterior to the motor control center (block 220). Again, a display may be disposed on an exterior panel of the motor control center, a portable service unit, a remote control center, or a combination thereof. In this manner, the process 210 ensures that an operator is aware of the temperature and voltage condition within the motor control center before ever attempting to access the interior of the motor control center.

Figure 6:
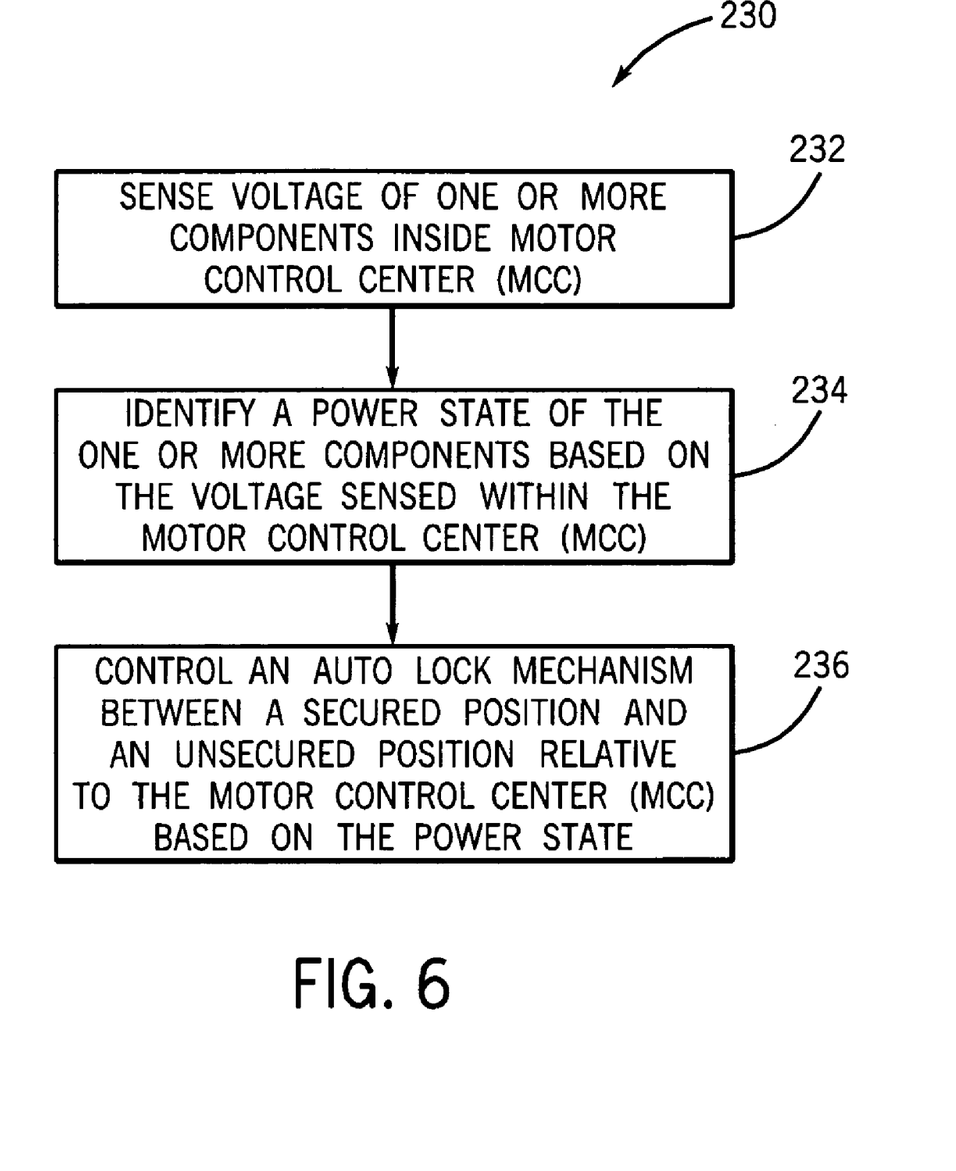
FIG. 6 is a flowchart illustrating and exemplary process of controlling access to a motor control center based on internally sensed parameters.

FIG. 6 is a flowchart of an exemplary process 230 for controlling access to a motor control center based on an internally sensed condition within the motor control center. For example, as illustrated, the process 230 may involve sensing voltage of one or more components inside the motor control center (block 232). The voltage sensing block 232 may use one or more touchless voltage sensors, such as an electric field sensor, to sense voltage of the components without making any contact with those components. In addition, voltage sensors may be directly connected to various wires and components within the motor control center. In either case, the block 232 senses voltage of the components while the motor control center remains completely enclosed and secured by a locking mechanism. The sensing block 232 also may involve wireless and/or optical communications of the sensed data from the voltage sensors to a processing unit or monitoring station inside the motor control center.

The process 230 may then proceed to identify the power state of the one or more components based on the voltage sensed within the motor control center (block 234). For example, the block 234 may process electric field data obtained from various electric field sensors, and then determine a power level or state based on those measurements. The block 234 also may compare the measured levels with recorded levels for various operational states within the motor control center. For example, a first level may correspond to an on state of one component and an off state of one or more other components. By further example, a second power state may correspond to an on power state of all the components within the motor control center. Another example would be a power state in which all of the components are turned off within the motor control center. In view of these examples, the block 234 can potentially identify any number of power states based on the on or off states of individual components within the motor control center.

The process 230 then proceeds to control an auto lock mechanism between a secured position and an unsecured position relative to the motor control center based on the power state (block 236). For example, if the identified power state corresponds to the motor control center being fully energized, then the control block 236 may maintain or change the auto lock mechanism to the secured position to prevent entry into the motor control center. Depending on the particular application, certain power states within the motor control center may be considered as safe conditions to allow entry. For example, some power states may trigger the control block 236 to completely block access to the motor control center, while other power states may allow entry into the motor control center along with a warning or positive step by the operator. For example, the control block 236 may require the operator to manually engage an override on a door of the motor control center.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a power distribution center, comprising:
   an enclosure comprising an access door configured to move between a closed position and an open position;
   a monitoring system comprising one or more sensors configured to monitor operational parameters inside the enclosure without user access into the enclosure;
   an indicator coupled to the monitoring system, wherein the indicator is configured to provide an indication of the operational parameters inside the enclosure without user access into the enclosure; and an entry control system coupled to the monitoring system and the indicator, wherein the entry control system is responsive to the operational parameters monitored by the monitoring system, the entry control system is configured to lock the access door if the operation parameters are indicative of a potentially hazardous condition inside the enclosure, and the entry control system comprises a lock override configured to unlock the access door to enable user access into the enclosure during the potentially hazardous condition only after user acknowledgment of the potentially hazardous condition as indicated by the indicator.

2. The system of claim 1, wherein the entry control system comprises an auto lock/unlock mechanism coupled to the access door and controlled by the entry control system, and the entry control system is configured to automatically move a lock or latch between a locked position and an unlocked position in response to the operational parameters monitored by the monitoring system and a user access request for entry into the enclosure.

3. The system of claim 1, wherein the indicator comprises an audio alarm, a video alarm, or a combination thereof, and the entry control system is configured to control the indicator to alarm a user of the potentially hazardous condition at least when a user requests access for entry into the enclosure.

4. The system of claim 1, wherein the one or more sensors comprise a touchless voltage sensor coupled to the monitoring system.

5. The system of claim 4, wherein the touchless voltage sensor comprises a plurality of electric-field sensors electrically isolated from monitored components in the enclosure, and the electric-field sensors are electrically isolated from the monitoring system via opto-isolators, wireless tranceivers, optical cables, or a combination thereof.

6. The system of claim 1, comprising a thermal radiation sensor coupled to the monitoring system.

7. The system of claim 1, wherein the indicator comprises an external display coupled to the monitoring system and the entry control system.

8. The system of claim 1, comprising a wireless communication link coupled to the monitoring system and a plurality of the sensors distributed throughout the enclosure, and the wireless communication link is configured to electrically isolate the plurality of sensors from the monitoring system.

9. The system of claim 1, wherein the one or more sensors comprise a plurality of non-contact sensors electrically isolated from the monitoring system via respective optical cables.

10. The system of claim 1, wherein the one or more sensors comprise a plurality of touchless voltage sensors each configured to measure different levels of electrical fields emanating from components within a group to determine if certain components in the group are energized or de-energized.

11. The system of claim 10, wherein the monitoring system comprises a sensor baseline setup having a plurality of voltage measurements for each touchless voltage sensor, the plurality of voltage measurements correspond to different permutations of components being turned on and off, and the monitoring system is configured to compare the sensor baseline setup against actual voltage measurements during operation of the power distribution center.

12. The system of claim 1, wherein the entry control system comprises a solenoid-actuated latch responsive to the entry control system to automatically lock and unlock the access door based on the operational parameters monitored by the monitoring system.

13. The system of claim 1, wherein the one or more sensors comprise a plurality of non-contact temperature sensors and a plurality of non-contact voltage sensors distributed throughout the enclosure, each sensor is configured to monitor a group of components, each sensor is electrically isolated from the components, each sensor is electrically isolated from the monitoring system via a wireless or optical communication link, and each sensor communicates data for use with the monitoring system and the entry control system.

14. The system of claim 1, wherein the monitoring system comprises a data logging system configured to continuously monitor and log temperature and voltage data from the one or more sensors, generate historical/trend graphs or profiles, load or modify control schemes based on the data, and enable dynamic sensor control based on the data.

15. A system, comprising:
a monitoring system configured to mount to a power distribution center, wherein the monitoring system comprises a thermal radiation sensor and an electric field sensor disposed inside the power distribution center and configured to measure operational conditions inside the power distribution center, and the operational conditions comprise a potentially hazardous condition inside the power distribution center;
an auto lock mechanism configured to move between a locked position and an unlocked position of a door of the power distribution center in response to a control signal; and
an entry control system coupled to the monitoring system and the auto lock mechanism, wherein the entry control system is configured to transmit the control signal to the auto lock mechanism in response to the operational conditions measured inside the power distribution center, and the entry control system is configured to control the auto lock mechanism to move from the unlocked position to the locked position or maintain the locked position if the measured operational conditions indicate the potentially hazardous condition within the power distribution center;
wherein the entry control system comprises a lock override configured to override the auto lock mechanism from the locked position to the unlocked position during operation of the power distribution center while the measured operational conditions indicate the potentially hazardous condition, after user acknowledgement of the potentially hazardous condition indicated by an indicator, to enable user entry into the power distribution center during the potentially hazardous condition.

16. The system of claim 15, wherein the auto lock mechanism comprises a solenoid operated door latch, or a motor driven lock, or a combination thereof, responsive to the control signal from the entry control system.

17. The system of claim 15, wherein the indicator comprises an audio alarm, a visual alarm, or a combination thereof, controlled by the entry control system and indicative of the potentially hazardous condition.

18. The system of clam 15, comprising a wireless communication link configured to facilitate wireless communications of sensed data and electrically isolate the thermal radiation sensor and electric field sensor from the monitoring system and the entry control system.

19. The system of claim 15, wherein the thermal radiation sensor comprises a thermopile, a radiation pyrometer, an infrared detector, or a combination thereof.

20. The system of claim 15, wherein the thermal radiation sensor and the electric field sensor are both electrically isolated from the monitoring system via respective optical cables.

21. The system of claim 15, wherein the electric field sensor is configured to measure different levels of electrical fields emanating from components within a group to determine if certain components in group are energized or de-energized.

22. The system of claim 21, wherein the monitoring system comprises a sensor baseline setup having a plurality of voltage measurements for the electric field sensor, the plurality of voltage measurements correspond to different permutations of components being turned on and off, and the monitoring system is configured to compare the sensor baseline setup against actual voltage measurements during operation of the power distribution center.

23. The system of claim 15, wherein the monitoring system comprises a data logging system configured to continuously monitor and log temperature and voltage data from the thermal radiation sensor and the electric field sensor, generate historical/trend graphs or profiles, load or modify control schemes based on the data, and enable dynamic sensor control based on the data.

24. A method, comprising:
  sensing voltage of one or more components within a power distribution center via one or more sensors inside the power distribution center without user access into the power distribution center;
  identifying a power state of the one or more components based on the voltage sensed by the one or more sensors within the power distribution center via an indicator disposed outside of the power distribution center, wherein identifying the power state comprises indicating a potentially hazardous condition within the power distribution center during operation of the power distribution center;
  controlling an auto lock mechanism of an access door between a secured position and an unsecured position relative to the power distribution center based on the sensed voltage and identified power state, wherein controlling comprises automatically moving the auto lock mechanism to the secured position and maintaining the secured position if the power state is energized to the potentially hazardous condition within the power distribution center; and
  overriding the auto lock mechanism of the access door from the secured position to the unsecured position during operation of the power distribution center while the power state is energized to the potentially hazardous condition, after user acknowledgement of the potentially hazardous condition indicated by the indicator, to enable user entry into the power distribution center during the potentially hazardous condition.

25. The method of claim 24, wherein sensing voltage comprises detecting an electric field from the one or more components.

26. The method of claim 24, wherein identifying the power state comprises displaying the power state via a display screen at a destination external to the power distribution center.

27. The method of claim 24, wherein overriding comprises automatically moving the auto lock mechanism from the secured position to the unsecured position in response to user input via a keyboard or touch screen.

* * * * *